United States Patent
Wyatt et al.

(10) Patent No.: US 7,213,086 B2
(45) Date of Patent: May 1, 2007

(54) SYSTEM HAVING A STORAGE CONTROLLER THAT MODIFIES OPERATION OF A STORAGE SYSTEM BASED ON THE STATUS OF A DATA TRANSFER

(75) Inventors: Stewart R. Wyatt, Boise, ID (US);
Andrew M. Spencer, Eagle, ID (US);
Robert G. Mejia, Boise, ID (US);
Connie K. Lemus, Boise, ID (US);
Kenneth J. Eldredge, Boise, ID (US);
Cyrille de Brebisson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 233 days.

(21) Appl. No.: 10/695,363

(22) Filed: Oct. 28, 2003

(65) Prior Publication Data
US 2005/0091425 A1  Apr. 28, 2005

(51) Int. Cl.
*G06F 3/00* (2006.01)
*G06F 1/32* (2006.01)
*G06F 5/00* (2006.01)

(52) U.S. Cl. .................. 710/52; 713/320; 713/324; 710/8; 710/18

(58) Field of Classification Search ............... 713/322, 713/324; 710/57
See application file for complete search history.

(56) References Cited

U.S. PATENT DOCUMENTS

| 4,288,860 | A * | 9/1981 | Trost ..................... 711/167 |
| 2003/0067847 | A1* | 4/2003 | Silvester ................ 369/30.23 |
| 2003/0149929 | A1* | 8/2003 | White ..................... 714/766 |
| 2003/0172325 | A1* | 9/2003 | Wyatt et al. ............... 714/53 |

\* cited by examiner

*Primary Examiner*—Kim Huynh
*Assistant Examiner*—Scott Sun (57) ABSTRACT

A system comprises a storage controller for managing transfers of data between a host and storage memory; a data mover coupled to the storage controller handling data transferred between a host and storage memory; and a buffer coupled to the data mover for storing data being transferred. The storage controller modifies operation of the storage system based on status of the data transfer. An associate method comprises transferring data between a host and storage memory via a storage system, and dynamically adjusting operation of the storage system depending on status of the data transfer.

6 Claims, 3 Drawing Sheets

SYSTEM HAVING A STORAGE CONTROLLER THAT MODIFIES OPERATION OF A STORAGE SYSTEM BASED ON THE STATUS OF A DATA TRANSFER

BACKGROUND

In most electronic devices there is generally a tradeoff between performance and power consumption. In particular, faster or enhanced performance generally requires more power. In battery-powered devices, increased power consumption therefore generally means shorter battery life for the device. Portable and other electronic devices that rely on a battery power supply have become more prevalent. Correspondingly, management of power consumption issues has become increasingly important.

Maximum performance can be a priority for many electronic devices and applications. For battery-powered devices, however, the amount of power consumed may be more important to the user than the performance or speed of the device. For example, a mobile phone user may accept lower performance in exchange for less power consumption and thus longer battery life. Similarly, a user of a portable computer may accept slower performance in exchange for longer battery life. Accordingly, some electronic devices incorporate various operational modes that allow for intelligently reducing performance to conserve power and to extend battery life.

Most electronic systems and devices today incorporate some kind of memory storage system. Generally, the host system uses the memory storage system to store data for retrieval later. Often the internal transfers of data within a memory storage system can occur at rates much faster than the transfer rates of the data to the host seeking the data (or faster than the rate the host can use the data). The difference in data transfer rates for the internal memory system versus the interface rates to a host seeking access to the memory system can be substantial. As a result, the storage system is often capable of supplying data to the host faster than the host can receive or use it. Such a mismatch in transfer rates can occur if the host is set to operate at a slower speed to conserve power. If the host speed is slowed down to conserve power, the mismatch between the transfer rates for the host and the storage system may be exacerbated.

A mismatch in the transfer rates of the host and the storage system can result in delays when the storage system waits for the host to catch up. Stalling or idling the storage system to accommodate the host transfer rate does not necessarily affect performance, since the throughput would still equal the host transfer rate. Having a substantial subsystem such as the memory storage system sitting idle, however, can have deleterious effects on power consumption and efficiency.

BRIEF SUMMARY

In accordance with at least some embodiments of the invention, a system comprises a storage controller for managing transfers of data between a host and storage memory, a data mover coupled to the storage controller handling data transferred between a host and storage memory, and a buffer coupled to the data mover for storing data being transferred. The storage controller modifies operation of the storage system based on status of the data transfer.

In other embodiments, a method comprises transferring data between a host and storage memory via a storage system and dynamically adjusting operation of the storage system depending on status of the data transfer.

BRIEF DESCRIPTION OF THE DRAWINGS

For a detailed description of the exemplary embodiments of the invention, reference will now be made to the accompanying drawings in which.

NOTATION AND NOMENCLATURE

Certain terms are used throughout the following description and claims to refer to particular components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to." Also, the term "couple" or "couples" is intended to mean either an indirect or direct electrical or communicative connection. Thus, if a first device couples to a second device, that connection may be through a direct connection, or through an indirect connection via other devices and connections.

DETAILED DESCRIPTION

The following discussion is directed to various exemplary embodiments of the invention. The embodiments disclosed should not be interpreted, or otherwise used, to limit the scope of the disclosure or claims. In addition, one skilled in the art will understand that the following description has broad application. The discussion of any embodiment is meant only to be exemplary of that embodiment and is not intended to limit the scope of the disclosure or claims to that embodiment. In this disclosure, numerous specific details may be set forth to provide a sufficient understanding of the embodiment. However, those skilled in the art will appreciate that the invention may be practiced without such specific details. In other instances, well-known elements may have been illustrated in schematic or block diagram form in order not to obscure the disclosure in unnecessary detail. Additionally, some details may have been omitted where such details were not considered necessary to obtain a complete understanding of the embodiment, and are considered to be within the understanding of persons of ordinary skill in the relevant art. It is further noted that all functions described herein may be performed in either hardware or software, or a combination thereof, unless indicated otherwise.

Figure 1:
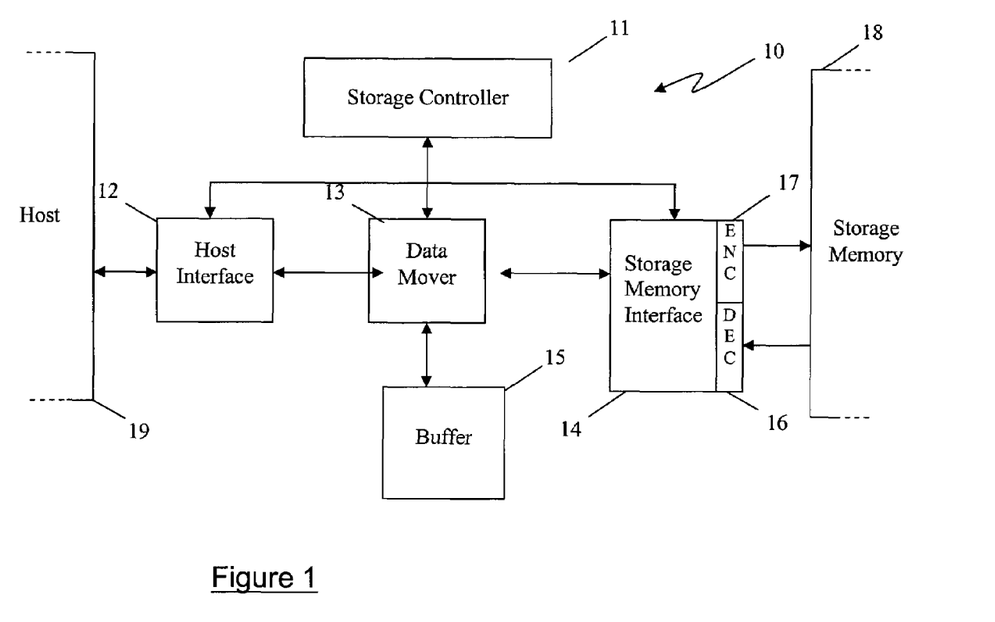
FIG. 1 is a system diagram of an embodiment of a system incorporating storage system power management in accordance with the present invention.

Referring initially to FIG. 1, an embodiment of a system 10 incorporating storage system power management in accordance with exemplary embodiments of the present invention is shown. In the embodiment of FIG. 1, a storage controller 11 is shown coupled to a host interface 12, a data mover 13, and a storage memory interface 14. The host interface 12 couples to a host 19. The storage memory interface 14 couples to storage memory 18. The data mover 13 couples to the host interface 12 and storage memory interface 14. A buffer 15 couples to the data mover 13.

The system 10 as shown in FIG. 1 manages and handles access requests from a host 19 to the system's storage memory 18. Such access requests may include reads or writes from memory. For example, the host 19 may seek to read data from the storage memory 18 or write data to the storage memory 18. Regardless of the type of access (read or write), the storage controller 11, host interface 12, data mover 13, and storage memory interface 14 are involved in transferring the data between the host 19 and storage memory 18.

The storage memory 18 may comprise any kind of electronic storage or memory that allows data or information to be stored or retrieved. Examples of storage memory devices would include hard disk drives, tape drives, memory cards, memory sticks, compact disk drives, DVD drives, memory cards, ROM or RAM, for example. Storage memory devices are used in almost every type of electronic host systems and devices for storage and retrieval of data. Such hosts 19 would include computers, digital cameras, PDA devices, mobile phones, audio players, and television sets, for example.

The host interface 12 provides an interface to transfer data to and from the host 19. The host interface 12 is generally responsible for providing access to the host 19 to send and receive commands and data. The host interface 12 generally comprises the interface circuitry or logic required to communicate and transfer data to and from the host 19. The specific design of the host interface 12 may depend on the type of host 19. For example, the host interface 12 may be different if the host 19 is a PDA versus a digital camera. The host interface also could be a standard format that is used by a variety of hosts, such as Compact Flash memory cards. In addition, the host interface 12 could be different depending on whether the host 19 is local or remote. For example, the host interface 12 could provide an interface to a remote host 19 accessible via a network. There may be one or more hosts 19 and host interfaces 12 in the system 10. The storage system's ability to dynamically adjust the power versus performance tradeoff may be useful for removable storage (such as Compact Flash memory cards) or other situations where the storage memory may be required to interface with multiple hosts. For purposes of clarity in this discussion, however, one host 19 and host interface 12 is assumed.

The storage memory interface 14 provides an interface to transfer data to and from storage memory 18. The storage memory interface 14 is responsible for accessing the storage memory 18 to store and retrieve data. The storage memory interface 14 generally comprises the interface circuitry or logic required to transfer data to and from the storage memory 18. The specific design of the storage memory interface 14 depends on the type of storage memory 18. For example, the storage memory interface 14 would be different if the storage memory 18 is a disk drive versus RAM. In addition, the storage memory interface 14 would be different depending on whether the storage memory 18 is local or remote. For example, the storage memory interface 14 could provide an interface to remote storage memory 18 accessible via a network. There may be one or more storage memory interfaces 14 and storage memories 18 in the system 10. For purposes of this discussion, however, one storage interface 14 and its associated storage memory 18 will be discussed.

When a transfer of data is desired, the host 19 sends a request command to the storage controller 11 via the host interface 12. The storage controller 11 receives and manages access requests from the host 19. The storage controller 11 also manages or instructs the other storage system components to which the controller 11 couples (i.e., the host interface 12, the data mover 13, and the storage memory interface 14) to transfer data between the host 19 and storage memory 18.

The data is stored in 512 byte units called "sectors" or "blocks." When the storage controller 11 receives the request command from the host 19, the controller 11 interprets the command. For example, in the case of a read request (i.e., the host 19 reads data from the storage memory 18) the controller 11 inspects the command to determine the number of memory blocks requested. In some cases, the host may not specify the number. The transfers to and from memory are performed on data in units of blocks or sectors. Depending on the complexity of the storage controller 11, the controller 11 also may perform any one of known predictive or speculative techniques to estimate the number of blocks of data that may be required from memory. With an estimate of the number of blocks is desired, the controller 11 then may request the total estimated amount of data from the storage memory 18. Generally, the total estimated number of blocks may be greater than the number of blocks initially requested by the host 19 in the request command.

In many systems, the number of blocks the host 19 can request or handle at one time may be limited. For example, the host 19 may only be able to request a single block at a time. If multi-block transfers are possible by host 19, accurately predicting the need for multiple blocks can greatly enhance system performance and efficiency rather than handling separately each individual request for a block. Multi-block transfers often can be handled more efficiently because the data from one block may be processed while the data from the next block is being retrieved from memory. By way of example, it may take 640 clock cycles to retrieve data from storage memory 18 and another 305 clock cycles to process the data (for example, to decode the data if the data was encoded before storage). Accordingly, a single block of data would require 945 clock cycles. If each block were handled separately, then each block would require 945 clocks. If, however, subsequent blocks of data could be retrieved while the prior block was being processed, then the overall time required could be reduced. This technique may be referred to as "pipelining" the data.

For an example illustrating the resulting benefits of pipelining data in a storage system, 10 blocks of data may need to be processed. If each block is processed separately, the 10 blocks would require 10×945 clocks=9450 clocks. If the blocks are pipelined, then the total time needed for the 10 blocks would be (1×945 clocks)+(9×640 clocks)=6705 clocks. The 305 clocks required to process each block is not encountered after the first block since that time occurs simultaneously with the 640 clocks required to retrieve each subsequent block. The result is a savings of 2745 clocks for a 29% reduction in clock cycles required to process the same number of blocks. The ability to pipeline data transfers in the storage system may provide opportunities to conserve power as well (as discussed more fully below). Depending on how the data transfer is optimized; the pipelining may be improved by increasing the buffer size.

Once the storage controller 11 determines the total number of blocks to be transferred from storage memory 18, the controller 11 informs the storage interface 14 of the number of blocks or sectors to be transferred (which may include the estimated or speculative amount). In the case of a protocol in which the host does not specify the amount of data to be transferred, the storage interface 14 may be given either a predictive number or a suitably large number. The controller 11 also instructs the data mover 13 to start the transfer. In addition, the controller 11 informs the host interface 12 of the actual number of blocks requested by the host 19. In this way, the storage interface 14 is prepared to transfer the total estimated number of blocks to the data mover 13, and the host interface 12 is prepared to transfer the actual number of blocks requested to the host 19. This process is for a read operation in which the host 19 has requested data from the storage memory 18.

For a write operation in which the host 19 moves data to the storage memory 18, the process may be similar, but not identical. Generally no predictive or speculative techniques need be used to estimate the number of blocks of data to be transferred. In addition, the data is transferred in the opposite direction, i.e., from the host 19 to the storage memory 18. The storage controller 11 receives a write command from the host 19. The storage controller 11 interprets the command and determines the number of blocks to be transferred to storage memory 18. The storage controller 11 instructs the host interface 12 and storage interface 14 of the number of blocks to be transferred. In addition, the controller 11 also instructs the data mover 13 to start the transfer. In this way, the host interface 12 is prepared to transfer the desired number of blocks from the host 19 to the data mover 13, and the storage interface 14 is prepared to transfer the desired number of blocks to the storage memory 18 for storage.

In the embodiment shown in FIG. 1, the data mover 13 handles the data as the data is transferred between the host 19 and storage memory 18. Once the storage controller 11 has received a request for a data transfer from the host 19 and has interpreted the request command, the storage controller 11 instructs the data mover 11 to initiate the transfer. As noted, the host 19 may request a read or write operation. The data mover 11 thus handles transfers of data from storage memory 18 to the host (read operation) and from the host 19 to storage memory 18 (write operation). When instructed by the storage controller 11 to initiate a data transfer, the data mover 13 instructs the host interface 12 or storage interface 14 to begin a transfer.

For a read operation, the data originates from the storage memory 18. The data mover 13 instructs the storage interface 14 that the data mover 13 is prepared for the transfer and for the storage interface 14 to retrieve the desired data from storage memory 18 for transfer to the data mover 13. The data mover 13 may be prepared to accept a number of blocks of data equal to or less than the total estimated number of blocks determined by the storage controller 11. The data mover 13 continues to accept data from the storage interface 14 until the total number of blocks determined is transferred. While accepting data from the storage interface 14, the data mover 13 also handles transferring the data to the host 19 via the host interface 12. When the data is ready for transfer to the host 19, the data mover 13 instructs the host interface 12 to begin the transfer to the host. As data is being transferred to the host 19 via the host interface 12, the data mover 13 can then accept additional data from the storage memory 18 via the storage memory interface 14. The data mover 13 continues to accept data from the storage interface 14 and to provide the data to the host interface 12 until the transfer is complete (e.g., when the total number of blocks has been transferred, the end of memory is reached, or the host 19 issues a stop command.)

For a write operation, the data originates from the host 19. The data mover 13 instructs the host interface 12 that the data mover 13 is prepared for the transfer and for the host interface 12 to transfer the desired data from the host 19 to the data mover 13. The data mover 13 may be prepared to accept a number of blocks of data equal to or less than the number of blocks to be transferred by the host 19 as determined by the storage controller 11. The data mover 13 continues to accept data from the storage interface 14, however, until the transfer is complete. While accepting data from the host interface 12, the data mover 13 also handles transferring the data to the storage memory 18 via the storage interface 14. As the data is ready for transfer to the storage memory 18, the data mover 13 instructs the storage interface 14 to begin the transfer to the storage memory 18. As data is transferred to the storage memory 18 via the storage interface 12, the data mover 13 then can accept additional data from the host 19 via the host interface 12. The data mover 13 continues to accept data from the host interface 12 and to provide the data to the storage interface 14 until the transfer is complete.

The data transfer rate to/from the host 19 may not be the same as the data transfer rate to/from the storage memory 18. This mismatch in rates may affect the data mover's 13 ability to effectively transfer data between the host 19 and storage memory 18. For example, the storage memory 18 transfer rates may be faster than the rates at which the host 19 can transfer or use the data. If there is a mismatch in transfer rates, a buffer 15 can be used to store data as the data is transferred between the host 19 and storage memory 18.

In the embodiment of FIG. 1, buffer 15 couples to the data mover 13. The data mover 13 may store data received by the host interface 12 or storage interface 14 in the buffer 15 for subsequent retrieval. One or more buffers 15 could be utilized for this function, however, for purposes of this discussion only one buffer 15 will be discussed. In systems where the transfer rate of the storage interface 14 is faster than the transfer rate of the host interface 12, the buffer generally may be used for storage of data from the storage interface 14 for later retrieval by the host interface 12. In this embodiment, the data mover 13 manages the storage and retrieval of data in the buffer 15.

In a system where the transfer rate of the storage interface 14 is faster than the transfer rate of the host interface 12, the use of a buffer 15 allows data to be transferred from storage memory 18 at the faster transfer rate of the storage interface 14 and then later retrieved from the buffer 15 at the slower transfer rate of the host interface 12. This process may free the storage interface 14 and storage memory 18 to handle other tasks such as requests from other hosts 19. If only one host 19 exists, however, the storage memory 18 may be dedicated to serving that host 19 and the storage memory 18 may have to wait for the host 19 to complete the transfer at the transfer rate of the host interface 12. This delay, in which the storage memory 18 and storage memory interface 14 may be idled, may provide an opportunity to conserve power (as discussed more fully below).

The storage interface 14 may incorporate error correction logic to improve the reliability of data recovery from the storage memory 18. In general, errors may be introduced in the data as a result of imperfections in the storage memory media or by other anomalies. The error correction logic in the storage interface 14 generally comprises an encoder 17 and a decoder 16. The encoder 17 encodes the data before writing the data to the storage memory 18. The decoder 16 decodes the data as the data is retrieved from the storage memory 18. The data may be encoded by encoder 17 into codewords that include the original data and one or more redundancy bits. The codewords then can be stored in the storage memory 18. When the data is recovered, the codewords are processed through the decoder 16. During decoding, the decoder 16 may detect and correct errors in the data.

The encoding process implemented by encoder 17 generally comprises loading the data and adding whatever redundancy bit(s) is (are) needed to the data to create a codeword. The codeword then is stored in the system's storage memory 18. When the data is retrieved, the decoder 16 processes the entire codeword (including both the data and redundancy bits), detects errors in the data, and corrects any errors detected in the data.

In accordance with various embodiments of the invention, the decoder 16 and encoder 17 implement an error-correcting code (ECC). The Reed Solomon code with its ability to correct bursts of errors may be used.

The storage system's error correction capability may be implemented in hardware using synchronous digital logic circuitry. As such, the latency of such circuitry may equal the number of clock cycles required for the data to propagate through the circuitry. The encoder 17 may have fewer gates than the decoder because the encoder need not detect and correct errors and, accordingly, the encoder may have less latency than the decoder. Alternatively stated, the decoder 16 may have more circuitry for the data to be clocked through (for detecting and correcting errors, for example) and, as a result, the latency for the decoding process is greater. Accordingly, the time required to perform the decoding process is generally longer than the time required to perform the encoding process. Correspondingly, given the relative size of the circuitry required for the decoder and the longer time required by the decoder, the power consumption for the decoding process may be larger than for the encoding process.

In the embodiment of FIG. 1, the system 10 can take advantage of some characteristics of the storage system to conserve power. In particular, where the storage system has a mismatch of transfer rates and a relatively large decoder 16, there is the potential for significant power savings. During read operations data can be transferred from the storage memory 18 at the faster rate of the storage interface 14. The data mover 13 can utilize the buffer 15 to store the data for retrieval by the host 19 at the slower rate of the host interface 12. Once the data has been retrieved by the storage interface 14, the storage interface may be left idle while the host interface 12 transfers the data from the data mover 13 and buffer 15. Leaving the storage interface 14, and particularly the decoder 16, powered up, but idle, creates a significant waste of power. Furthermore, the storage interface 14 operates inefficiently if the interface 14 fills the buffer one sector at a time as the host 19 reads data. Accordingly, power savings can be achieved by turning off the decoder 16 once the data has been retrieved by the storage interface 14 and passed to the data mover 13 and buffer 15. The decoder 16 may be turned off by turning off the power to the decoder circuitry or by turning off the clock (not specifically shown) for the decoder circuitry.

In this embodiment of the system 10, the storage controller 11 can monitor the status of the data transfer via the data mover 13 to determine when the decoder 16 should be turned off. When the transfer from the storage interface 14 has filled the buffer, the storage controller 11 can disconnect the clock and/or power from the decoder 16 to turn the decoder 16 off. When the storage controller 11 determines that the host 19 has retrieved some or most of the data from buffer 15, the storage controller 11 can turn the decoder 16 back on by reconnecting the clock or power to the decoder 16. Since the decoder 16 may represent a significant portion of the storage system, and the power consumed by the storage system logic, turning off the decoder 16 can result in significant power savings.

Additionally, the storage controller 11 also may conserve power by adjusting the data transfer rate of the storage interface 14 to substantially match the data transfer rate of the host interface 12. By monitoring the capacity or fill rate of the buffer 15 via the data mover 13, the storage controller 11 can determine how the data transfer rate of the storage interface 14 compares to the data transfer rate of the host interface 12. If the buffer 15 is filling up, the rate of transfer into the buffer 15 is greater than the rate of transfer out of the buffer 15. Conversely, if the buffer 15 is emptying, the rate of transfer into the buffer 15 is slower than the rate of transfer out of the buffer 15. For a read operation, the rate of transfer into the buffer may be the transfer rate of the storage memory interface 14, and the rate of transfer out of the buffer may be the transfer rate of the host interface 12. For a write operation, the rate of transfer into the buffer may be the transfer rate of the host interface 12, and the rate of transfer out of the buffer may be the transfer rate of the storage memory interface 14. The method of switching the storage interface off and on as discussed above also accomplishes an approximate match of the transfer rates.

The "fill" status of the buffer 15 can be tracked via pointers that indicate the number of buffer blocks filled versus blocks available. Other mechanisms can be used as well to determine the fill status. Flags may be set as the buffer 15 reaches certain predetermined levels based on the pointers. When the flags become set, the storage controller 11 may initiate an adjustment to the data transfer rate of the storage interface 14. Accordingly, the data transfer rate of the storage interface 14 may be slowed or accelerated depending on the fill status of the buffer 15. Adjusting the data transfer rate of the storage interface 14 may be accomplished by adjusting the clock rate used by the storage interface 14. The clock rate may be adjusted via a programmable PLL (phase locked loop), dividing the clock signal, or by other mechanisms. Slowing the clock effectively decreases the data transfer rate of the storage interface 14 while accelerating the clock effectively increases the data transfer rate of the storage interface 14. The clock and corresponding data transfer rate may be adjusted iteratively until the rates of the storage interface 14 and host interface 12 match or are otherwise generally similar. A particular setting of the clock rate may be stored in non-volatile memory for use as a default upon the next power-up of the system.

By matching the data transfer rate of the storage interface 14 to the data transfer rate of the host interface 12, the data may be more effectively pipelined through the logic of the storage system (and of particular importance through the logic of the storage interface 14 including the large circuitry of the decoder 16). As explained previously, pipelining the data may result in power savings because fewer clock cycles may be required to process the same amount of data. In addition, the storage interface 14 and storage memory may be operated at a lower performance level, which also may result in power savings as faster performance usually requires more power.

If the transfer rate of the storage interface 14 is faster than the transfer rate of the host interface 12, the storage interface 14 may complete the data transfer from storage memory and sit idle for the next data request. In effect, this lag time between transfers of data may result in the system handling the data requests individually and that may prevent effective pipelining of data requests together. With a delay between data transfers, pipelining the retrieval of a subsequent data request may not be possible with the processing of a current data request. Matching the transfer rates may eliminate or reduce the lag time and may resolve this issue allowing the data to be effectively pipelined. As noted above, facilitating the pipelining of data through the storage system can result in a substantial savings of time (clock cycles) required to retrieve and process the data. Any savings in the amount of time the storage interface 14 (and particularly the decoder 16) has to operate may result in a corresponding savings in power consumed. Thus, by handling the data transfers in a pipelined fashion, additional power savings may be achieved.

In addition, matching the data transfer rate of the storage interface 14 to the data transfer rate of the host interface 12 may result in operating the storage interface 14 and storage memory at a reduced or less than maximum performance level. Since maximum performance generally corresponds to maximum power consumption in storage systems as well as most electronic devices, this reduction in performance level may result in a reduction of power consumption as well.

Depending on the storage system and the system's operational characteristics, maximum power conservation may be achieved by operating the storage interface 14 and storage memory 18 at maximum performance to quickly fill the buffer with data so the storage memory and interface 14 can be turned off. The size of buffer 15 may be determined accordingly. By increasing the buffer size, more data may be loaded into the buffer 15 at a fast transfer rate from storage memory 18. The storage interface 14 (or a portion thereof may then be turned off for longer periods of time while the host interface 12 unloads the data from the buffer 15. As noted previously, the larger buffer 15 may also facilitate pipelining of the data yielding further efficiencies in the data transfer that may reduce power consumption as well. On the other hand, maximum power conservation may be achieved by adjusting the data rates during data transfer to more closely match the rates of the host and storage memory interfaces, 12 and 14. By matching the rates, power may be conserved by pipelining the data (resulting in fewer clock cycles to perform the same function) and by operating the storage memory and interface 14 at a lower performance level. In this case, power optimization can be achieved without a large buffer 15 since the buffer 15 would be filled and drained at the same or approximately the same rate. Alternatively, a combination of these approaches may be implemented. For example, operating the storage system at a reduced performance level may conserve power; yet further reducing the performance to match the rate of the host may not provide as much power savings as turning off the storage memory interface 14. This situation may occur in a system at a point in which power savings resulting from reducing performance may be outweighed by the savings achieved by completing the transfer and turning off a portion of the storage system. Depending on the system, this result may always be the case or may occur at some point in the performance versus power relationship of the system.

Figure 2:
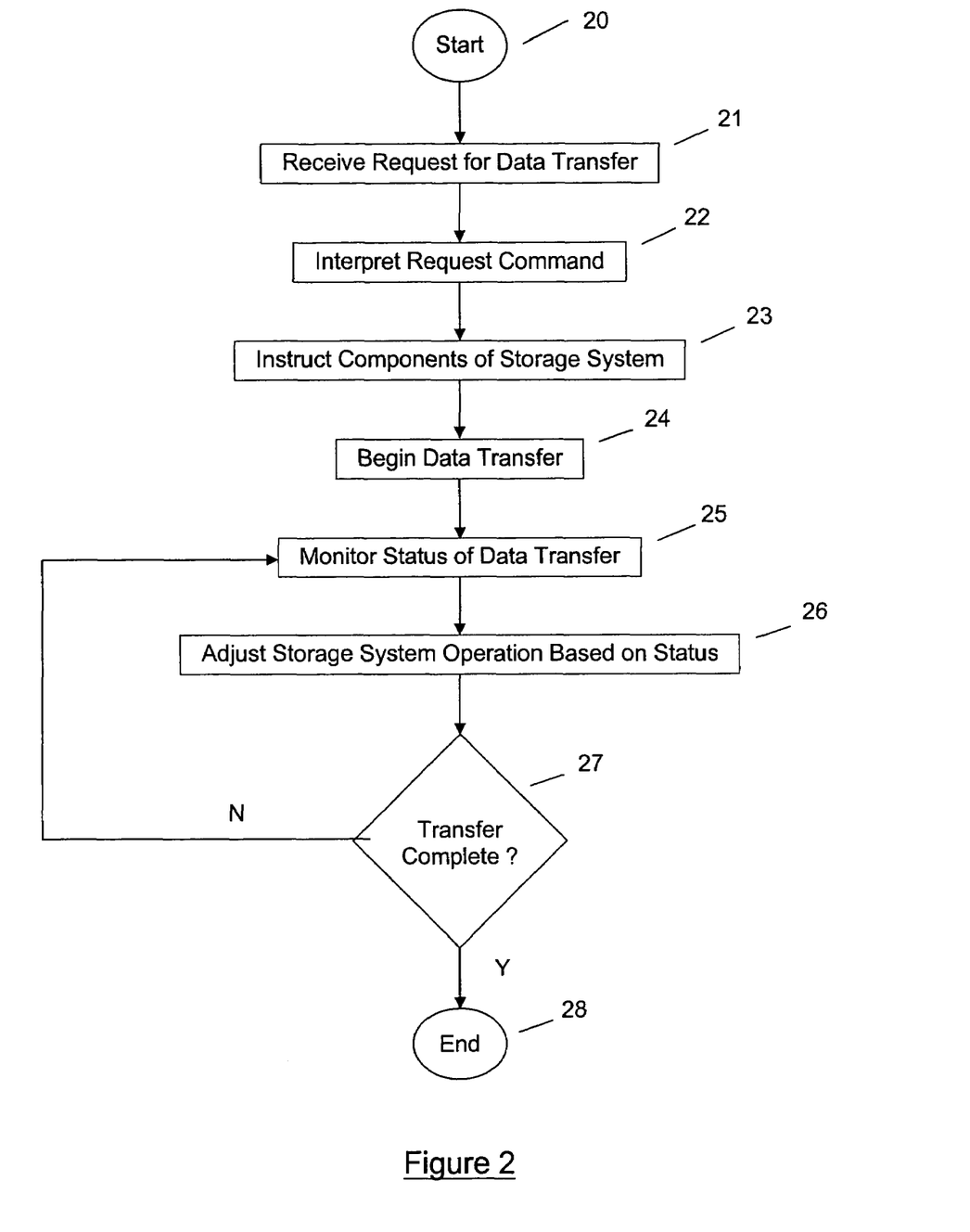
FIG. 2 is a flow chart illustrating an embodiment of a method for storage system power management in accordance with the present invention.

FIG. 2 is a flow chart illustrating an embodiment of a method implemented in accordance with various embodiments of the invention. The method of FIG. 2 starts at block 20. In block 21, a request for a data transfer is received. Generally, the request may be for a data transfer between a host and storage memory. In the embodiment of the system of FIG. 1, the host may send the request command to the storage controller via the host interface. The request may be for data to be retrieved from storage memory (a read operation) or may be for data to be sent to storage memory (a write operation). When the request is received, the request command is interpreted as indicated in box 22. The request command would be interpreted to determine specific information about the data transfer requested such as what type of data transfer (read/write), which data is to be transferred (addresses), and how much data is to be transferred, for example. Informed with this information about the requested data transfer, the other components of the storage system can be instructed regarding the requested transfer in box 23. In the embodiment of FIG. 1, the storage controller 11 instructs the host interface 12, data mover 13, and storage memory interface 14 accordingly. The host interface 12 may be instructed as to the amount of data to be transferred to/from the host 19, for example. The storage interface 14 may be instructed as to the amount of data to be transferred to/from memory 18, and the address in memory for the data, for example. The data mover 13 may be instructed regarding the type of transfer, the amount of data to be transferred to/from storage memory 18, and the amount of data to be transferred to/from the host 19.

Once the request has been interpreted and the components of the storage system have been instructed regarding the requested data transfer, the requested data transfer can begin as indicated in box 24. For a read operation, the data initially is transferred from storage memory 18 for subsequent transfer to the host 19. For a write operation, the data initially is transferred from the host 19 for subsequent transfer to storage memory 18. The status or progress of the data transfer is monitored as indicated in box 25. Monitoring the status of the data transfer may involve determining when the data transfer has been completed, for example, by determining when all the requested data has been transferred, or may involve other monitoring techniques. One such technique may include monitoring the capacity of data buffer 15 in which the transferred data is temporarily stored while being transferred between the host 19 and storage memory 18. By monitoring the capacity of the buffer 18, the transfer rates to/from the host 19 can be compared to the transfer rates to/from the storage memory 18. For example, in a read operation data initially is transferred from storage memory 18. This transfer generally occurs at the transfer rate of the interface 14 to the storage memory 18. The data retrieved from storage memory 18 may be stored in a buffer 15 for subsequent transfer to the host 19. The data then may be retrieved from the buffer 15 for transfer to the host 19. This transfer generally occurs at the transfer rate of the interface to the host 19. If the remaining capacity of the buffer is decreasing, then the transfer rate into the buffer is determined to be faster than the transfer rate out of the buffer. Whereas for a read operation, the transfer rate of the storage memory is faster than the transfer rate of the host. If the remaining capacity of the buffer is increasing, then the transfer rate into the buffer is slower than the transfer rate out of the buffer. Whereas, for a read operation, the transfer rate of the storage memory is slower than the transfer rate of the host. For a write operation, the opposite conclusion is true since the data is flowing into the buffer from the host and out of the buffer to storage memory.

Using the monitored status of the data transfer, in box 26 the operation of the storage system may be adjusted or modified based on the status of the data transfer in order to conserve power. In some embodiments, the transfer rates to the host and storage memory can be adjusted to more closely match one another. This adjustment may be accomplished by adjusting the clock rate for either the interface to the storage memory or the interface to the host. By monitoring the remaining capacity of the buffer as discussed above, the relative rates of transfer to the host and storage memory can be determined. These rates can be adjusted until the remaining capacity in the buffer stabilizes or otherwise reaches a predetermined desirable status. As discussed above, generally matching the rates of the transfers from the host and storage memory may also yield power savings, for instance, by enabling effective pipelining of the data requests. In another embodiment, adjusting the operation may include turning off at least a portion of the storage system once the data transfer has progressed past that portion of the storage system. Such an adjustment also may yield power savings. Other adjustments to the operation of the storage system also may be made to achieve power savings. The adjustments may be interrupt driven and may be initiated by flags set based on the monitored status of the data transfer. Accordingly, the adjustments may occur dynamically throughout the data transfer.

In box 27, a determination is made regarding whether the data transfer has completed. If the transfer is not complete, control returns to box 25 and the process continues by monitoring to the status of the data transfer. Depending on the status of the data transfer, which may change as the transfer progresses, additional adjustments to the operation of the storage system may be made in box 26. When the transfer has completed, as determined in box 27, the process ends at box 28. The process may be repeated when the next request for a data transfer is received.

Figure 3:
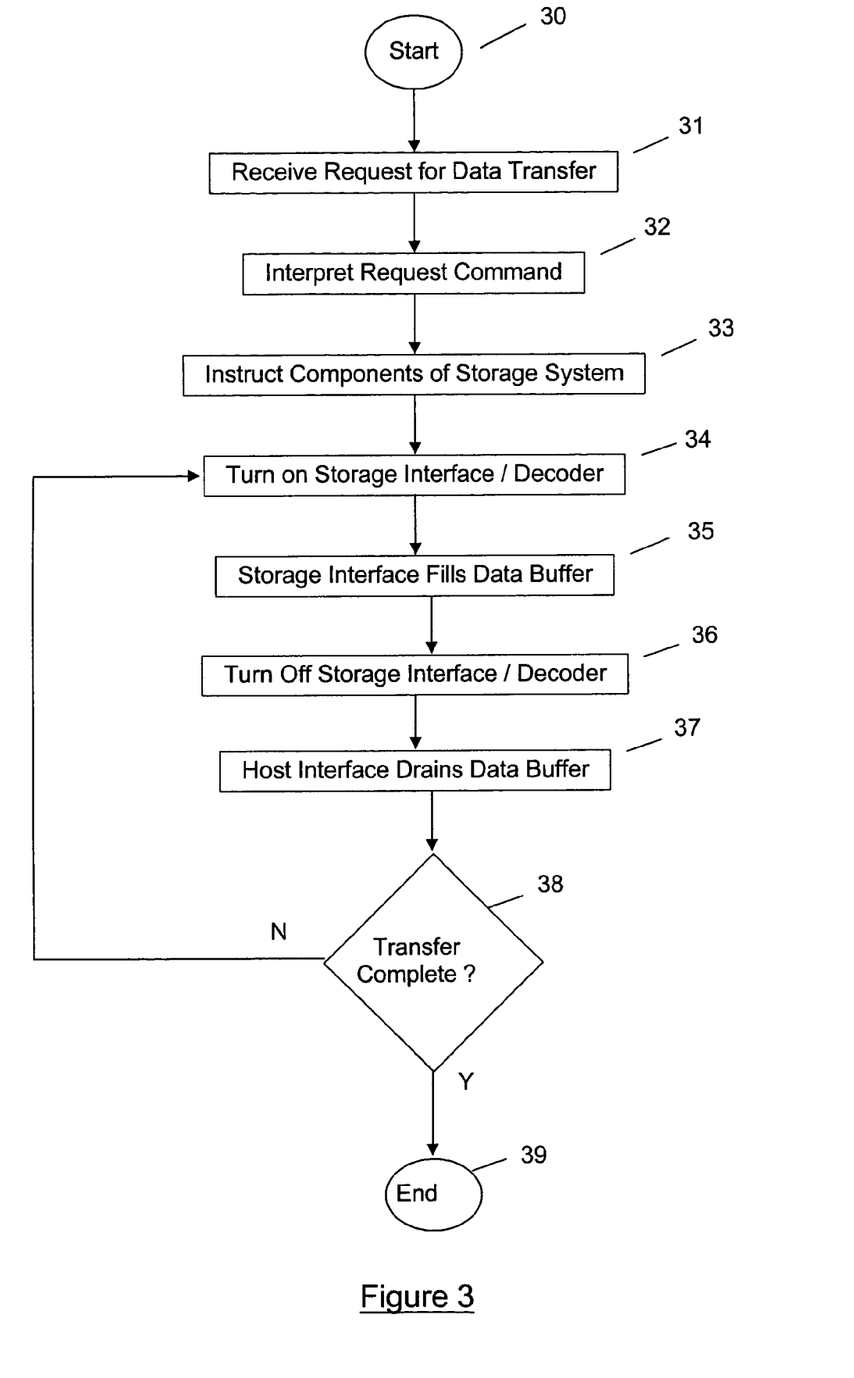
FIG. 3 is a flow chart illustrating another embodiment of a method for storage system power management in accordance with the present invention.

FIG. 3 is a flow chart illustrating another embodiment of a storage system power management method. The embodiment of the method of FIG. 3 starts at box 30. Boxes 31–33 are the same as boxes 21–23 of FIG. 2 and will not be readdressed in detail here. A request for a data transfer is received in box 31. The request is interpreted in box 32. Once the request has been interpreted, the components of the storage system are instructed regarding the requested data transfer in box 33. Once the components have been instructed, the storage system is ready to begin the data transfer. However, before beginning the data transfer (as in FIG. 2, box 24), a portion of the storage system is turned on in box 34. In this embodiment, for example, the decoder 16 in the storage interface 14 to the storage memory is turned on in box 34. Alternatively, the entire storage interface or any portion thereof also may be turned on. With the decoder 16 on, the storage interface 14 can fill the data buffer 15 with data retrieved from storage memory 18 as indicated in box 35. Although in the embodiment of FIG. 3, the decoder 16 is described as being turned on after the command has been interpreted in box 33 and after the components have been instructed in box 34, the decoder (or other portion of the storage system) may be turned on anytime after the request is received in box 31.

Once the storage interface 14 has filled the data buffer, the decoder 16 (or any portion of the storage interface) can be turned off in box 36. The decoder may be turned off in box 36 when the storage interface has finished transferring the requested data from the storage memory or when the data buffer is full. In box 37, the host interface 12 drains the data buffer by transferring the data from the buffer to the host. The host interface 12 may be draining the buffer at the same time as the storage interface is filling the buffer. Box 38 determines if the data transfer has been completed. If not, the data transfer continues in box 34 and the decoder 16 is turned back on to resume filing the data buffer. When the transfer has completed, the process ends at box 39 but the entire process may be repeated when the next request for a data transfer is received. By turning off the decoder or other portion of the storage interface between or during data transfers from storage memory, substantial power savings may be achieved. The savings achieved by turning off the decoder would be most significant in storage systems utilizing a complex ECC and thus having large decoder circuitry.

The above discussion is meant to be illustrative of the principles and various embodiments of the present invention. Numerous variations and modifications will become apparent to those skilled in the art once the above disclosure is fully appreciated. For example, the system and method for storage system power management may at times incorporate more or less components or functions than the embodiments described herein. This disclosure makes those principles and modified embodiments apparent to those skilled in the art. It is intended that the following claims be interpreted to embrace all such variations and modifications.

What is claimed is:

1. A storage system, comprising:
 a storage controller for managing transfers of data between a host and storage memory,
 a data mover coupled to the storage controller, the data mover handles data transferred between the host and the storage memory; and
 a buffer coupled to the data mover for storing data being transferred between the host and the storage memory;
 a storage memory interface coupled to the data mover, the storage memory interface handles data transferred to and from storage memory, the storage memoy interface also including error correction logic;
 wherein, to conserve power, the storage controller selectively turns off a portion of the storage system based on an amount of data in the buffer,
 wherein the storage controller turns off the error correction logic of the storage memory interface in the storage system if the amount of data in the buffer reaches a threshold amount.

2. The storage system of claim 1 wherein the storage controller selectively turns off a portion of the storage system based on a capacity of the buffer.

3. The storage system of claim 1 wherein data is transferred between the data mover and host at a first transfer rate, and data is transferred between the data mover and storage memory at a second transfer rate, and wherein the storage controller selectively matches the first and second transfer rates.

4. The system of claim 1 wherein the error correction logic of the storage memory interface comprises:
 an encoder for encoding data to be stored in storage memory; and
 a decoder for decoding data retrieved from storage memory;
 wherein the storage controller turns off the decoder in the error correction logic of the storage memory interface if the amount of data in the buffer reaches a threshold amount.

5. The system of claim 4 wherein the storage controller turns off the decoder by disconnecting power to the decoder.

6. The system of claim 4 wherein the storage controller turns off the decoder by disconnecting a clock signal to the decoder.

* * * * *

UNITED STATES PATENT AND TRADEMARK OFFICE
CERTIFICATE OF CORRECTION

PATENT NO. : 7,213,086 B2 Page 1 of 1
APPLICATION NO. : 10/695363
DATED : May 1, 2007
INVENTOR(S) : Stewart R. Wyatt et al.

It is certified that error appears in the above-identified patent and that said Letters Patent is hereby corrected as shown below:

In column 12, line 23, in Claim 1, delete "memory," and insert -- memory; --, therefor.

In column 12, line 31, in Claim 1, delete "memoy" and insert -- memory --, therefor.

Signed and Sealed this

Fourth Day of November, 2008

JON W. DUDAS
*Director of the United States Patent and Trademark Office*